(12) United States Patent
Tsai

(10) Patent No.: US 6,376,835 B1
(45) Date of Patent: Apr. 23, 2002

(54) SCANNER MODULE WITH ADJUSTABLE MAGNIFICATION RATIO

(75) Inventor: Jenn-Tsair Tsai, Taipei-Hsien (TW)

(73) Assignee: Mustek Systems Inc., Hsinchu (TW)

( * ) Notice: Subject to any disclaimer, the term of this patent is extended or adjusted under 35 U.S.C. 154(b) by 0 days.

(21) Appl. No.: 09/427,980

(22) Filed: Oct. 26, 1999

(30) Foreign Application Priority Data

Feb. 2, 1999 (TW) .......................................... 88201724

(51) Int. Cl.⁷ ............................................... H04N 1/024
(52) U.S. Cl. ...................... 250/234; 250/235; 250/239; 358/483
(58) Field of Search ................................. 250/216, 239, 250/234, 235, 236, 208.1; 358/482, 483, 500, 512, 513, 514; 348/262, 266, 270, 294, 311

Primary Examiner—John R. Lee

(74) Attorney, Agent, or Firm—Ladas & Parry

(57) ABSTRACT

A scanner module with adjustable magnification ratio includes a photo-mechanical body, a charge-coupled device module and a pressing device, such as a wedge element or an adjusting screw. The photo-mechanical body is arranged along an optical distance and has a first plane vertical to the direction of the optical distance. The charge-coupled device module is arranged along the direction of the optical distance in the photo-mechanical body and has a second plane vertical to the optical distance and facing to the first plane. The pressing device is supported by the second plane and vertical to the first plane, for enabling the charge-coupled device module to move back and forth along the optical distance. Therefore, the magnification ratio of the scanner module can be adjusted through the length of the optical distance. In addition, a cylinder or guiding slot can also be arranged at the sides of the charge-coupled device module in the photo-mechanical body, for positioning the charge-coupled device module when the photo-mechanical body is moving.

8 Claims, 3 Drawing Sheets

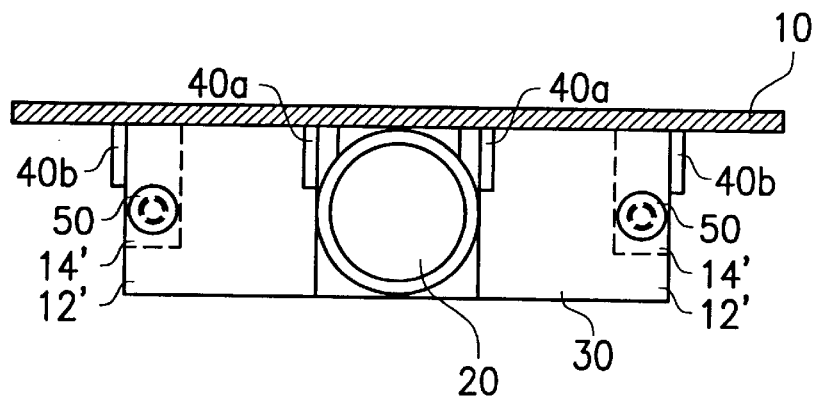
Fig. 4A
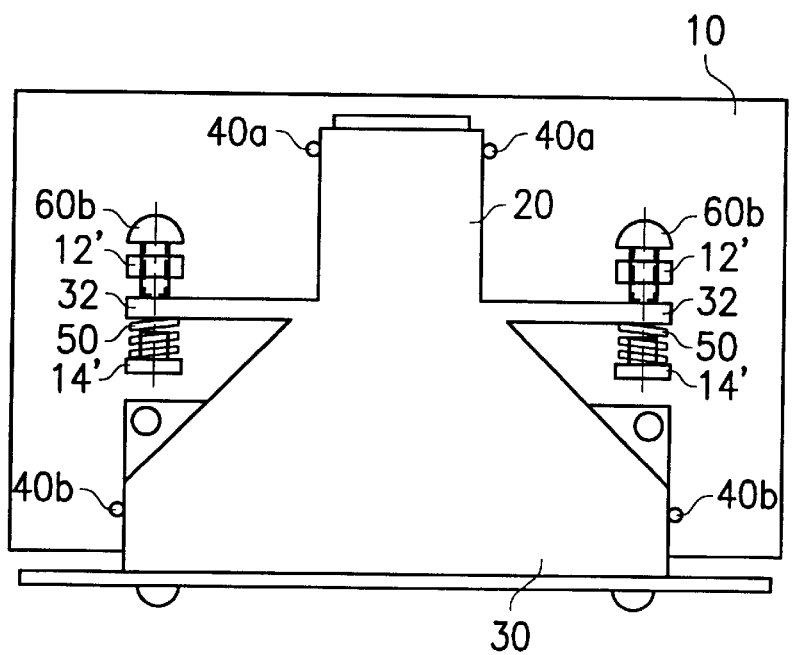 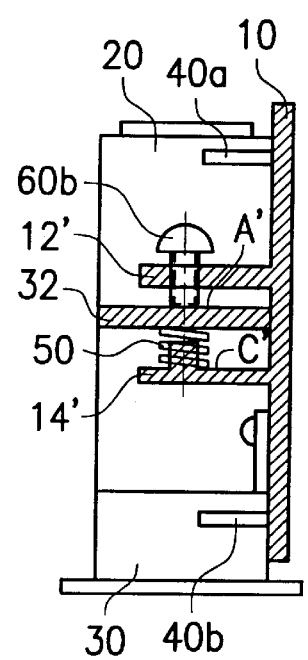
Fig. 4B      Fig. 4C

SCANNER MODULE WITH ADJUSTABLE MAGNIFICATION RATIO

BACKGROUND OF THE INVENTION

Field of the Invention

This invention relates to a scanner, particularly to a scanner module with adjustable optical distance and magnification ratio. The scanner module includes a pressing device (such as a wedge element or an adjusting screw) and a fastening spring for adjusting (lengthening or shortening) the total optical distance from a document to the charge-coupled device module, thus reducing the tolerance of the magnification ratio.

DESCRIPTION OF THE PRIOR ART

FIG. 1 (Prior Art) is a diagram illustrating basic operations of a scanner module, wherein an object 1 to be scanned (such as a document or a picture) is focused and imaged at a charge-coupled device 3 through a lens 2. The distance between the center of the lens 2 and the object 1 is called an object distance p; and the distance between the center of the lens 2 and the charge-coupled device 3 is called an image distance q. The magnification ratio between the object 1 and the image is defined as the ratio of the image distance q to the object distance q.

$$\text{magnification ratio} = \frac{\text{image}}{\text{object}} = \frac{q}{p}$$

In a scanner module, the object distance p is normally longer than the image distance q. Therefore, the total optical distance is ordinarily lengthened by virtue of reflective mirrors to minimize the space the scanner module occupies, as shown in FIG. 2 (Prior Art). In this case, the object distance p between the center of the lens 2 and the object 1 can be treated as the sum of all the reflective paths passing through the four mirrors M, M2, M3 and M4, that is: p=p1+p2+p3+p4+p5. Therefore, the optical distance may vary due to variation in angles of the mirrors M1, M2, M3, and M4 and affect the magnification ratio and MTF value of the scanner module. In addition, the change in shape of the photo-mechanical body and the casing (not shown in the figure) may also result in difference of the optical distance and increase the tolerance of the magnification ratio. Assume the tolerance of the magnification ratio of the lens 2 is approximately ±1%, taking into account the difference of the optical distance (OD), the tolerance of the entire magnification ratio of the scanner module can reach from 1.5% to 2%. Hence, the image quality may be significantly affected.

However, current scanner modules fail to improve the magnification ratio substantially. As a result, the required tolerance of the magnification ratio (such as 0.5%) of the lens 2 must be reduced to render better image quality. Unfortunately, this will also reduce the yield of the lens and the entire magnification ratio of the scanner module is also higher than the tolerance of the lens 2.

SUMMARY OF THE INVENTION

Accordingly, it is an object of this invention is to provide a scanner module with adjustable optical distance and adjustable magnification ratio, wherein the tolerance of the scanner module can be reduced (even lower than the tolerance of magnification ratio of a single lens) to substantially enhance the picture quality.

It is another object of this invention is to provide a scanner module with adjustable magnification ratio, wherein a support plane is formed on the photo-mechanical body to push the charge-coupled device module to move back and forth along the direction of the optical distance, and to extend or shorten the total optical distance (object distance p plus image distance q) of the scanner module. When the total length of the optical distance of the scanner module changes, the magnification ratio of the scanner module can be also adjusted to the optimum.

To achieve the above objects, this invention provides a scanner module with adjustable magnification ratio. The scanner module includes a photo-mechanical body, a charge-coupled device module and a pressing device, such as a wedge element or an adjusting screw. The photo-mechanical body is arranged along an optical distance and has a first plane vertical to the direction of the optical distance. The charge-coupled device module is arranged along the direction of the optical distance in the photo-mechanical body and has a second plane vertical to the optical distance and facing to the first plane. The pressing device is supported by the second plane and vertical to the first plane, for enabling the charge-coupled device module to move back and forth along the optical distance. Therefore, the magnification ratio of the scanner module can be adjusted through the length of the optical distance. In addition, a cylinder or guiding slot can also be arranged at the sides of the charge-coupled device module in the photo-mechanical body, for positioning the charge-coupled device module when the photo-mechanical body is moving.

BRIEF DESCRIPTION OF THE DRAWINGS

The aforementioned objects, features and advantages of this invention will become apparent by referring to the following detailed description of a preferred embodiment with reference to the accompanying drawings, wherein:

FIGS. 4A–4C are three-dimensional diagrams illustrating a second embodiment of the scanner module of this invention.

DETAILED DESCRIPTION OF THE EMBODIMENTS

Figure 1:
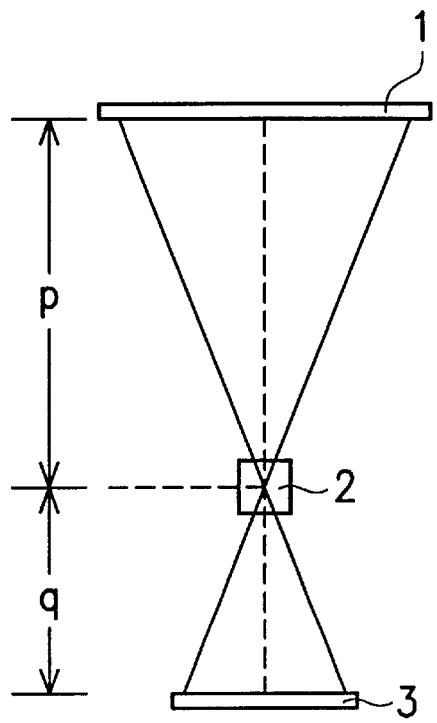
FIG. 1 (Prior Art) is a diagram illustrating basic operations of a scanner module.
Figure 2:
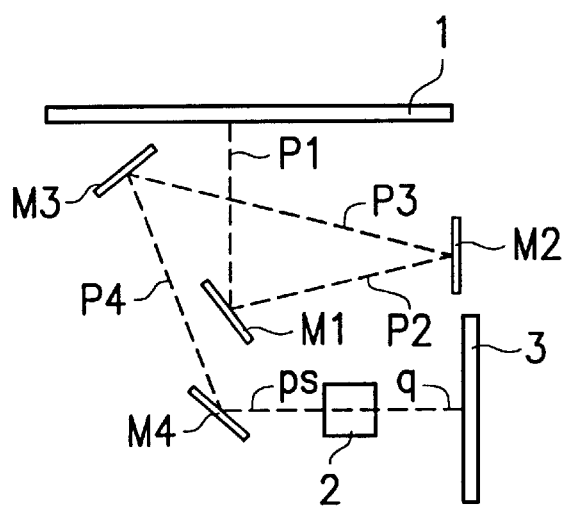
FIG. 2 (Prior Art) is a diagram illustrating the lengthening of the objective distance with a plurality of mirrors in the scanner module.

In a scanner module, the magnification ratio is defined as a ratio of the object distance to the image distance. When the length of the object distance is lengthened by reflections of multiple mirrors, as shown in FIG. 2, any shift of mirrors and change of casing may alter the object distance. Therefore, the precision of the magnification ratio will be affected. Consequently, this invention arranges a support plane in the photo-mechanical body, and uses a pressing device to push the charge-coupled device module to move along back and forth at the direction of the optical distance. Therefore, the total distance (object distance p plus image distance q) of the scanner module can be modified to reach the expected magnification ratio.

FIRST EMBODIMENT

Figure 3A:
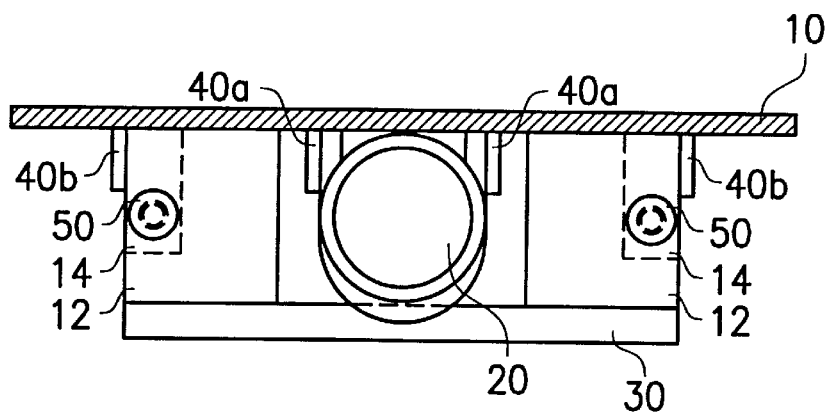
FIGS. 3A–3C are three-dimensional diagrams illustrating a first embodiment of the scanner module of this invention.
Figure 3B:
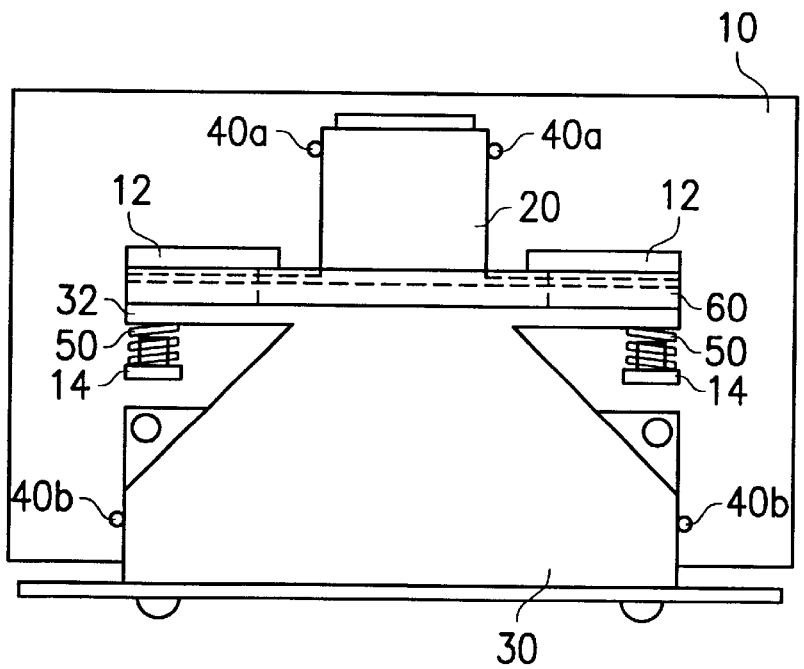
Figure 3C:
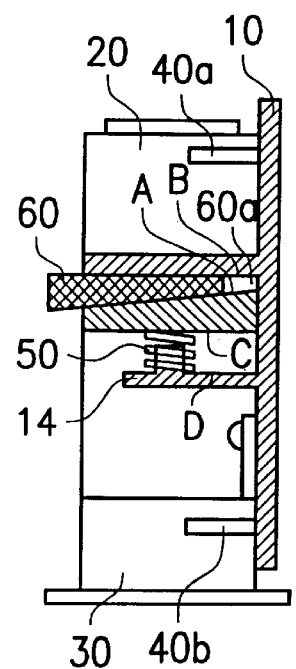

FIGS. 3A–3C are three-dimensional diagrams illustrating a first embodiment of the scanner module. In this embodiment, the scanner module basically includes a photo-mechanical body 10, a lens module 20, and a charge-coupled device module 30. The lens module 20 and the charge-coupled device module 30 are arranged in the photo-mechanical body 10 along an optical distance. The charge-coupled device module 30 further includes a wing section 32 along the optical distance. The wing section 32 has a inclined plane A and a plane C at rear. The photo-mechanical module 10 also forms a support portion 12 having a plane B facing the inclined plane A. Thus a wedge-shaped space 60*a* is formed between the inclined plane A and the plane B.

In this embodiment, to adjust the magnification ratio of the scanner module, a wedge element 60 having its size and shape similar to the wedge-shaped space 60*a* is first provided. Then the wedge element 60 is inserted in the wedge-shaped space 60*a* between the plane A and the plane B to enable the charge-coupled device module 30 to move back and forth along the optical distance. In this embodiment, the wedge element 60 is supported by the inclined plane A of the wing portion 32, and pushed to press against the charge-coupled device module 30. Thus, the total optical distance and the tolerance of the magnification ratio of the scanner module can be modified to the optimum.

In addition, to prevent from bending of the wing portion 32 due to the pressing of the wedge-shaped element 60 against the charge-coupled device module 30, another support portion 14 having a planed D facing the plane C of the photo-mechanical body 10 can also be provided. As shown in FIG. 2, a spring 50 is formed on the plane D for fastening the wing section 32 between the support section 12 and the support section 14.

Moreover, a positioning device, such as a pair of cylinders 40*a*, 40*b* or a guiding slot (not shown) can also be arranged outside the lens module 20 and the charge-coupled device module 30 in the photo-mechanical body 10 along the direction of the optical distance. Therefore, when the wedge element 60 pushes the charge-coupled device module 30, unnecessary shift of the lens module 20 and the charge-coupled device 30 can be avoided.

SECOND EMBODIMENT

FIGS. 4A~4C are three-dimensional diagrams illustrating a second embodiment of the scanner module of this invention. In this example, the scanner module is the same as that of the first embodiment, including an photo-mechanical body 10, a lens module 20 and a charge-coupled device module 30. The lens module 20 and the charge-coupled device module 30 are arranged on the photo-mechanical body 10 along the optical distance. The charge-coupled device module 30 includes a wing section 32 along the optical distance. The wing section 32 includes a plane A' and a plane C' at rear. The photo-mechanical module 10 also forms a support portion 12' having a plane facing the plane A, and a screw hole (not shown) on the support plane 12'.

In this embodiment, to adjust the magnification ratio of the scanner module, an adjusting screw 60*b* fitted in the screw hole on the support section 12' is first provided. Then the adjusting screw is screwed to and penetrates through the support section 12' to press against the wing section 32 of the charge-coupled device module 30. This allows the charge-coupled device module 30 to move back and forth along the optical distance. The total optical distance and the tolerance of the magnification ratio of the scanner module can therefore be modified to the optimum.

Further, to prevent the wing section 32 from improper jerking, another support portion 14' having a plane C' facing the opposite surface of the plane A' can be also provided when the adjusting screw 60*b* pushes the charge-coupled device module 30. In addition, a spring 50 can be also formed on the plane C' to fasten the wing section 32 between the support section 12' and the support section 14'.

Moreover, a positioning device, such as a pair of cylinders 40*a* and 40*b* (not shown), can be arranged outsides the lens module 20 and the charge-coupled device module 30 on the photo-mechanical body 10. Therefore, when the lens module 20 and the charge-coupled device module 30 are pushed to move, unnecessary shift can be avoided.

To summarize, this invention provides a support section in the photo-mechanical body for supporting, and uses a pressing device to push the charge-coupled device module to move back and forth along the optical distance. Therefore, the total distance (object distance plus image distance) of the scanner module can be modified to reach the expected magnification ratio.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A scanner module with adjustable magnification ratio, comprising:
 a photo-mechanical body arranged along an optical distance and having a first plane perpendicular to the direction of said optical distance;
 a charge-coupling device module formed along said optical distance in said photo-mechanical body, having a second plane perpendicular to the direction of the optical distance and facing toward said first plane; and
 a pressing device supported by said second plane and vertically pressing to said first plane, for enabling the charge-coupled device module to move back and forth along said optical distance and adjust the magnification ratio of said scanner module.

2. The scanner module of claim 1, further comprising a positioning device formed at the side of said charge-coupled device module for positioning said charge-coupled device module when said photo-mechanical body is moving.

3. A scanner module with adjustable magnification ratio, comprising:
 a photo-mechanical body arranged along an optical distance and having a first plane perpendicular to the direction of said optical distance;
 a charge-coupling device module formed along said optical distance in said photo-mechanical body, having a second plane perpendicular to the direction of said optical distance, wherein a wedge-shaped space is formed between said first plane and said second plane; and
 a wedge element having a shape similar to said wedge-shape space, inserted in said wedge-shape space to push said charge-coupled device module to move back and forth along said optical distance and to adjust the magnification ratio of said scanner module.

4. The scanner module of claim 3, further comprising a pair of cylinders arranged at the sides of the charge-coupled device module in said photo-mechanical body, for positioning said charge-coupled device module when said photo-mechanical body is moving.

5. The scanner module of claim 3, wherein the photo-mechanical body comprises a third plane perpendicular to the direction of said optical distance and parallel to said charge-coupled device module, said third plane and said first plane are arranged at the opposite sides of said second plane, and a spring arranged between said third plane and said charge-coupled device module is supported by third plane to press against said charge-coupled device module.

6. A scanner module with adjustable magnification ratio, comprising:

- a photo-mechanical body arranged along an optical distance, having a first plane vertical to the direction of said optical distance;
- a charge-coupling device module formed along said optical distance in said photo-mechanical body, having a second plane perpendicular to the direction of said optical distance and facing to said first plane; and
- an adjusting screw screwed to said first plane and penetrating through said first plane to press on said second plane, for pushing said charge-coupled device module to move back and forth along said optical distance and to adjust the magnification ratio of said scanner module.

7. The scanner module of claim 6, wherein a pair of cylinders is arranged at the sides of the charge-coupled device module in said photo-mechanical body, for positioning said charge-coupled device module when said photo-mechanical body is moving.

8. The scanner module of claim 6, wherein the photo-mechanical body further comprises a third plane perpendicular to said optical distance and parallel to said charge-coupled device module, said third plane and said first plane are arranged at the opposite sides of said second plane, and a spring arranged between said third plane and said charge-coupled device module is supported by said third plane to press against said charge-coupled device module.

* * * * *